Feb. 7, 1956

M. J. SHEFFIELD 2,733,646

STRADDLE ROW SCRAPER AND CULTIVATOR
ATTACHMENT FOR TRACTORS

Filed June 12, 1953

Marvin J. Sheffield
INVENTOR.

BY *Clarence A. O'Brien*
*and Harvey B. Jacobson*
Attorneys

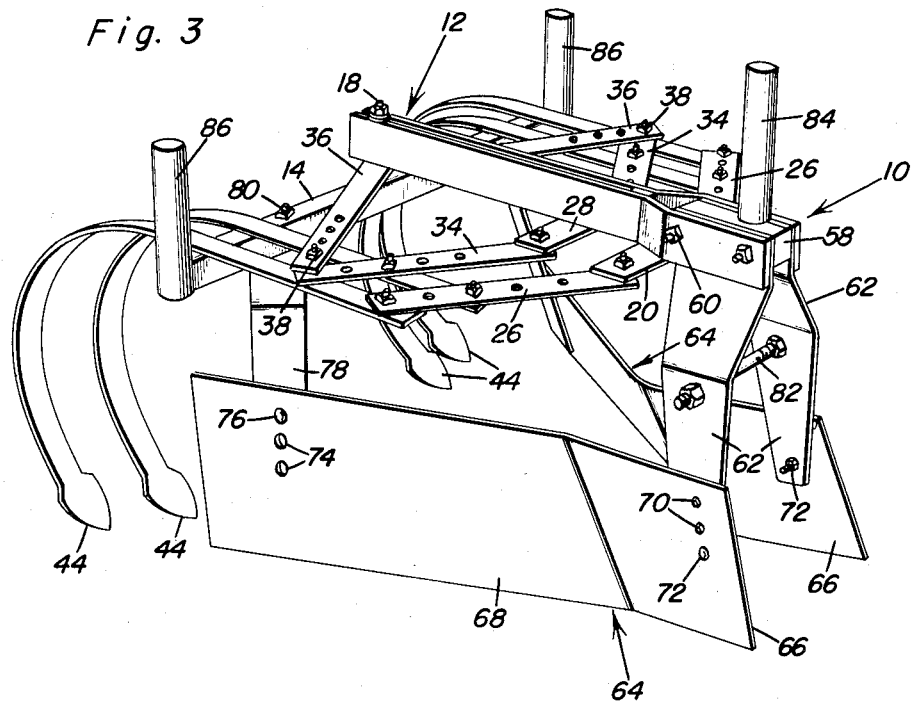
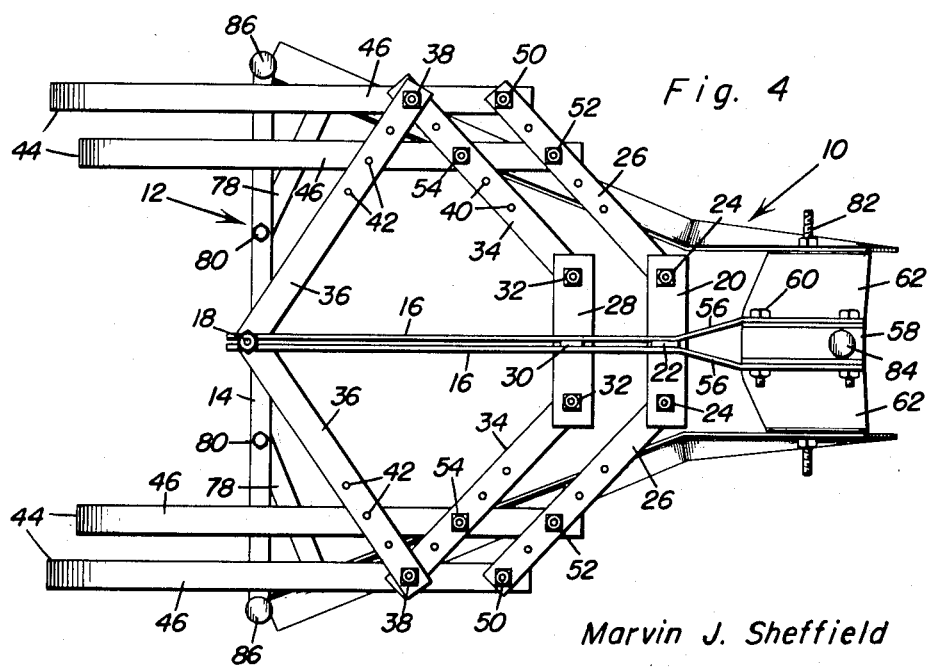

United States Patent Office 2,733,646
Patented Feb. 7, 1956

2,733,646

STRADDLE ROW SCRAPER AND CULTIVATOR ATTACHMENT FOR TRACTORS

Marvin J. Sheffield, Carrolton, Ga.

Application June 12, 1953, Serial No. 361,273

1 Claim. (Cl. 97—170)

This invention relates in general to improvements in farming implements, and more particularly to a cultivator attachment for tractors.

The present invention is an improvement on my Patent No. 2,073,884 issued March 16, 1937.

In a cultivating operation, the soil on opposite sides of a row of plants is loosened to facilitate the growth of such plants and at the same time to destroy weeds which may be growing adjacent the row of plants. Inasmuch as there is often debris and trash disposed adjacent a row of plants, this debris and trash is buried during the cultivating operation and tends to clog the soil so as to hinder growth of plants.

It is therefore the primary object of this invention to provide an improved cultivator attachment which may be conveniently attached to tractors for the cultivation of rows of plants, the cultivator attachment being provided with suitable earth scraping blades disposed on opposite sides of a row of plants for removing trash and debris out of the path of cultivator shovels carried by a supporting frame of the cultivator attachment.

Another object of this invention is to provide an improved cultivator attachment which includes a supporting frame having depending therefrom a plurality of cultivator shovels, said supporting frame also having depending therefrom a pair of earth scraping blades, the earth scraping blades being disposed forwardly of the cultivator shovels for removing trash and debris from the path of the same, the supporting frame being provided with means for varying the spacing between the earth scraping blades so as to vary the clearance between a row of plants and the earth scraping blades to accommodate different sizes of plants and at the same time to afford a maximum of removal of trash and debris.

Another object of this invention is to provide an improved cultivator attachment which includes a supporting frame adapted to be suspended under a tractor, the supporting frame having carried thereby a plurality of depending cultivator shovels, the cultivator being secured to mounting bars of the supporting frame, the mounting bars being adjustable so as to vary the spacing of the cultivator shovels.

A further object of this invention is to provide an improved cultivator attachment for tractors which includes a supporting frame having depending therefrom a plurality of cultivator shovels and earth scraping blades, the cultivator attachment being provided with a simple mounting means to facilitate the mounting and removal of the same with respect to a tractor.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 3 is an enlarged perspective view of the cultivator attachment of Figure 1 and shows the same removed from both the tractor and the mounting frame; and Figure 4 is a top plan view of the cultivator attachment of Figure 3.

Figure 1:
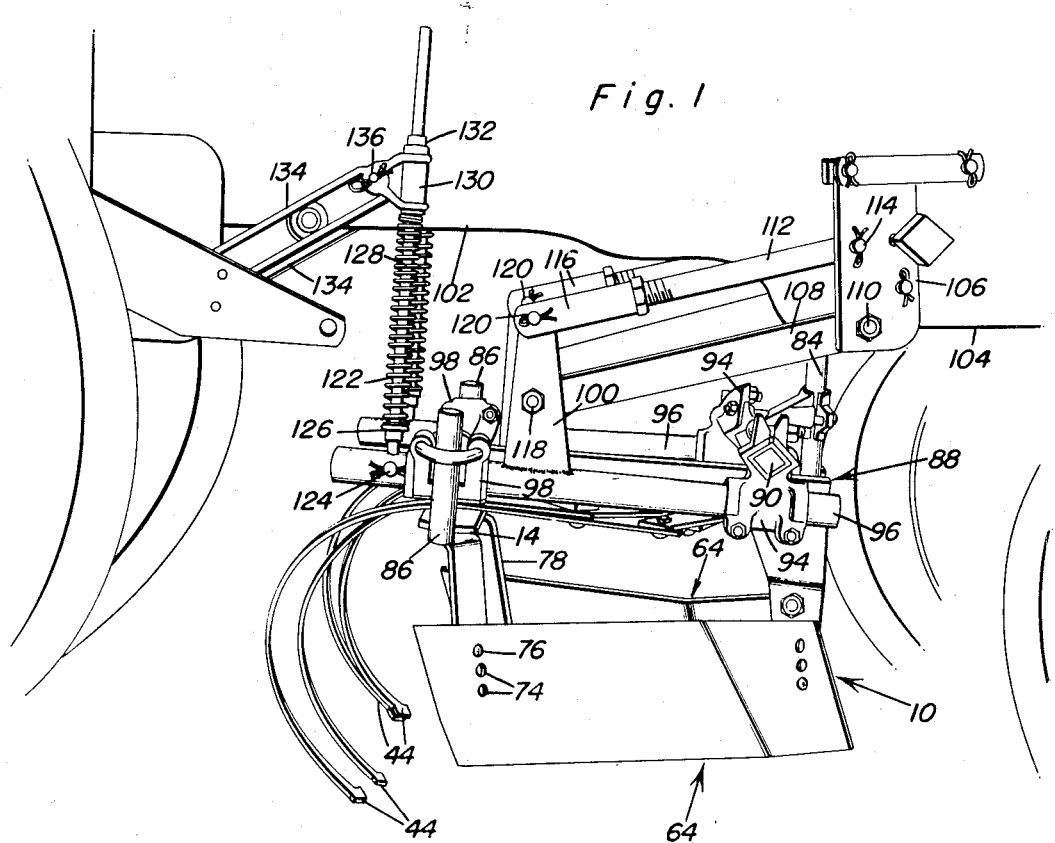
Figure 1 is a side perspective view of the cultivator attachment which is the subject of this invention and shows the same mounetd beneath a tractor, only a portion of the tractor being shown.
Figure 2:
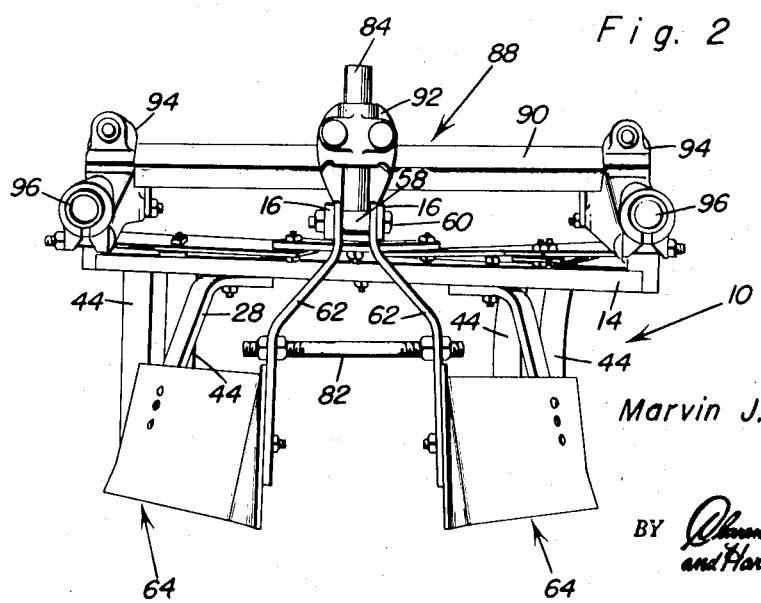
Figure 2 is a front perspective view of the cultivator atachment of Figure 1 and shows the same removed from the tractor by being provided with the supporting frame therefor.

Referring now to the drawings in detail, it will be seen that there is illustrated a cultivator attachment which is referred to in general by the reference numeral 10. The culitvator attachment 10 includes a supporting frame which is referred to in general by the reference numeral 12.

The supporting frame 12 includes a primary frame portion which is T shape in outline and includes a transversely extending rear frame member 14 which has secured to the central portion thereof a pair of spaced parallel longitudinal frame members 16, the longitudinal frame members 16 being disposed closely adjacent each other and are secured to the transverse extending frame member 14 adjacent their rear ends by a vertically extending fastener 18 which is slidably disposed between the longitudinally extending frame members 16 to permit adjustment between the longitudinally extending frame members and the transversely extending frame members.

Underlying the longitudinally extending frame members 16 adjacent their forward ends is a transversely extending mounting plate 20 which has a vertically extending intermediate portion 22, the intermediate portion being rigidly secured between the longitudinally extending frame members 16.

Pivotally secured to the outer end portions of the mounting plate 20 by fasteners 24 are outwardly and rearwardly projecting mounting bars 26.

Disposed intermediately rearwardly of the mounting plate 20 is a second mounting plate 28, the mounting plates 20 and 28 being disposed in spaced parallel relation. Like the mounting plate 20, the mounting plate 28 is provided with a vertically extending central portion 30 which extends upwardly between the longitudinally extending frame members 16 and is secured thereto. Pivotally connected to the end portions of the mounting plate 28 by vertically extending fasteners 32 are second rearwardly and outwardly extending mounting bars 34, the mounting bars 26 and 34 being disposed in spaced parallel relation.

Pivotally connected to the rear portion of the longitudinally extending frame members 16 are forwardly and outwardly projecting mounting bars 36. The mounting bars 36 are pivotally secured to the longitudinally extending frame members 16 by the fastener 18. The outer ends of the mounting bars 36 and 34, disposed on opposite sides of the longitudinally extending frame members 16 are connected together by vertically extending fasteners 38.

It will be noted that the mounting bars 34 are provided with a plurality of longitudinally spaced apertures 40 whereas the mounting bars 36 are provided with a plurality of longitudinally spaced apertures 42. It will be understood that the fasteners 38 may be selectively disposed in the apertures 40 and 42 so as to vary the effective width of the mounting areas of the mounting bars 26, 34, and 36.

Carried by the supporting frame 12 is a plurality of rearwardly depending cultivator shovels 44. The cultivator shovels 44 are conventional and have forwardly extending mounting arms 46 which are disposed in underlying relation with respect to the various mounting bars mentioned above. The outermost cultivator shovels 44 have their mounting arms 46 secured in position by the fasteners 38 adjacent their forward ends. The extreme forward ends of the mounting arms 46 of the outermost cultivator shovels 44 are connected by fasteners 50 to the mounting bars 26.

The cultivator shovels 44 disposed immediately adjacent the outermost cultivator shovels 44 are secured to the underside of the mounting bars 26 and 34 by fasteners 52 and 54, respectively. While there has been illustrated only two cultivator shovels on each side of the longitudinally extending frame members 16, it will be understood that more cultivator shovels may be carried by the mounting bars 26, 34, and 36, if so desired.

The extreme forward portions of the longitudinally extending frame member 16 diverge as at 56 and have disposed therebetween a mounting block 58, the forward ends of the longitudinal frame members 16 being secured to the mounting block 58 by suitable fasteners 60. Also secured to the longitudinally extending frame members 16 by the fasteners 60 are depending mounting brackets 62 whose lower portions are in generally spaced parallel relation.

Carried by the lower ends of the mounting brackets 62 for vertical adjustment are rearwardly extending earth scraping blades 64. The earth scraping blades 64 have spaced parallel forward portions 66 and rearwardly and outwardly extending portions 68. The forward portions 66 of the earth scraping blades 64 are provided with a plurality of vertically spaced apertures 70 in which are selectively received fasteners 72 which adjustably secure the earth scraping blades 64 to the mounting brackets 62.

The rear portions 68 of the earth scraping blades 64 also are provided with a plurality of vertically spaced apertures 74. Selectively connected to the rear portions 68 by fasteners 76 disposed in one of the apertures 74 are rear mounting brackets 78. The rear mounting brackets 78 are generally L-shaped in outline and have upper portions thereof connected to the transversely extending frame members 14 by fasteners 80.

It will be noted that the earth scraping blades 64 are disposed forwardly of the cultivator shovels 44 and in the path thereof. It is the intention of this invention that the earth scraping blades 64 be disposed closely adjacent the plants on the opposite sides of a row of plants for scraping trash and debris away from the row of plants and out of the path of the cultivator shovels 44 so that the ground adjacent the plants may be properly cultivated without debris and trash being turned under so as to hinder the growth of the plants of the row of plants. Inasmuch as it is highly desirable that the forward portions 66 of the earth scraping blades 64 be disposed as closely adjacent the plants as possible, and since the size of the plants to be cultivated by the cultivator attachment 10 vary, the mounting brackets 62 have extending between intermediate portion thereof an elongated fastener 82 which is of an adjustable effective length. By varying the effective length of the fastener 82, the spacing between the forward portion 66 of the earth scraping blades 64 may be varied as desired.

In order that the cultivator attachment 10 may be conveniently mounted beneath a tractor, the supporting frame 12 includes mounting posts disposed at free ends of the T-shaped primary frame portion, there being a forward mounting post 84 carried by the mounting block 58 and extending upwardly therefrom, and upwardly extending mounting posts 86 at the outer ends of the transversely extending frame member 14.

In order that the cultivator attachment 10 may be conveniently mounted beneath a tractor, there is provided a mounting frame which is referred to in general by the reference numeral 88. The mounting frame 88 includes a transversely extending forward bar 90 which has adjustably secured thereto a central clamping member 92. The clamping member 92 is adjustably clamped to both the bar 90 and the mounting post 84.

Carried at the outer ends of the bar 90 are adjustable clamps 94, the adjustable clamps 94 being adjustably carried by the bar 90 and adjustably clamping longitudinally extending tubular member 96 thereto. Adjustably carried by rear portions of the tubular members 96 are adjustable clamps 98 which are adjustably connected to the mounting posts 86.

The mounting frame 88 also includes upwardly extending mounting arms 100 which are rigidly secured at their lower ends to the tubular members 96 intermediate their ends.

Referring now to Figure 1 in particular, it will be seen that there is illustrated an intermediate portion of a tractor which is referred to in general by the reference numeral 102. The tractor 102 includes a frame 104 which has secured to the opposite sides thereof mounting brackets 106. Carried by the mounting brackets 106 for pivotal movement are spaced parallel mounting bars 108 whose forward ends are pivotally connected to the mounting brackets 106 by pivot members 110. Also, pivotally connected to the mounting brackets 106 are spaced parallel support rods 112, the forward ends of the support rods 112 being pivotally connected to the mounting brackets 106 by pivot pins 114. The support rods 112 are provided with adjustable ear portions 116 which are utilized to vary the effective lengths of the supporting rods 112.

It will be noted that the supporting bars 108 and the supporting rods 112 are disposed in spaced parallel relation with the rear ends of the supporting bars 108 being pivotally connected to the mounting plates 100 by fasteners 118. The rear ends of the rear portions 116 of the supporting rods 112 are pivotally connected to the upper ends of the mounting plates 100 by suitable pivot pins 120. It will thus be seen that the mounting frame 88 is mounted for vertical movement only due to the parallel relationship of the supporting bars 108 and the supporting rods 112.

Pivotally connected to the rear portions of the tubular members 96 are upstanding supporting rods 122, the supporting rods 122 being connected to the tubular members 96 by suitable pins 124. The lower portions of the supporting rods 122 are provided with suitable shoulders 126 against which rest the lower ends of coil springs 128, the coil springs 128 being carried by the supporting rods 122 in surrounding relation. The upper portions of the supporting rods 122 are adjustably received in suitable guide brackets 130 against which the upper ends of the coil springs 128 abut. The effective lengths of the supporting rods 122 are selectively varied by upper collars 132 adjustably carried by the upper portions of the supporting rods 122 and resting upon the guide member 130.

The guide members 130 are connected to a pair of lifting arms 134 for pivotal movement by pivot pins 136. It will be understood that the lifting arms 134 are hydraulically or otherwise controlled so as to vary the height of the guide members 130 whereby the cultivator attachment 10 may be raised or lowered as desired. By adjusting the effective lengths of the supporting rods 112, and the mounting bars 108, it will be seen that the desired tilt may be given to the mounting frame 88 whereby the cultivator attachment 10 may be positioned as desired with respect to the ground. It will also be understood that the coil springs 128 are provided so as to urge the mounting frame 88 downwardly but at the same time to permit upward movement of the same should the cultivator shovels strike any movable object.

In view of the foregoing, it will be seen that there has been illustrated and described a cultivator attachment which may be conveniently secured to the underside of a tractor for cultivating a row of plants. It will be understood that the cultivator attachment is of such a nature whereby the ground engaging blades may be varied so as to place the forward portions thereof as closely adjacent plants of a row of plants as possible. It will also be understood that the cultivator attachment 10 is so constructed whereby the individual cultivator shovels may be varied in number and spacing as desired.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly all suitable modifications and equivalents may be resorted to, falling within the scope of the appended claim.

What is claimed as new is as follows:

In a cultivator attachment adapted for mounting to a tractor, a main frame comprising a pair of parallel members spaced apart and extending along either side of the longitudinal center line of the cultivator, a rearward transverse frame member secured to the rear ends of the longitudinally extending frame members, a pair of substantially parallel cross members secured beneath the longitudinal frame members adjacent the forward ends of the longitudinal frame members, a pair of cultivator shovels having forwardly extending arms overlying said rearward member and supported thereby, pairs of generally parallel links pivotally connected to the ends of the cross members and to the forwardly extending arms of the cultivator shovels, stabilizing links pivotally connected adjacent their rear ends to the main frame adjacent the point where said rearward member is connected to the longitudinaly extending frame members, means connecting the opposite ends of said stabilizing links to one of the pivotal connections of said forwardly extending arms and said parallel links, a pair of scraper blades having generally parallel forward end sections and diverging rear end sections, means connecting said scraper blades in generally vertical working position to the forward and rear ends of said main frame, and posts for attaching the cultivator to a tractor located adjacent the outer ends of said rearward member and adjacent the forward ends of said longitudinal frame members.

References Cited in the file of this patent

UNITED STATES PATENTS

| | | |
|---|---|---|
| 936,943 | Reynolds | Oct. 12, 1909 |
| 962,001 | Brigden | June 21, 1910 |
| 1,091,760 | Pate | Mar. 31, 1914 |
| 1,520,824 | Kimbrough | Dec. 30, 1924 |
| 2,073,884 | Sheffield | Mar. 16, 1937 |
| 2,146,338 | Huey | Feb. 7, 1939 |
| 2,413,467 | Patterson | Dec. 31, 1946 |
| 2,560,631 | Burgess | July 17, 1951 |